(12) United States Patent
Boyer et al.

(10) Patent No.: US 11,003,901 B2
(45) Date of Patent: May 11, 2021

(54) ACTION DETECTION IN A VIDEO BASED ON IMAGE ANALYSIS

(71) Applicant: International Business Machines Corporation, Armonk, NY (US)

(72) Inventors: Trent W. Boyer, Columbus, OH (US); Steve McDuff, Unionville (CA); Ethan S. Headings, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/568,234

(22) Filed: Sep. 11, 2019

(65) Prior Publication Data

US 2021/0073524 A1 Mar. 11, 2021

(51) Int. Cl.
*G06K 9/00* (2006.01)
*G06T 7/246* (2017.01)
*G06K 9/62* (2006.01)

(52) U.S. Cl.
CPC ..... *G06K 9/00335* (2013.01); *G06K 9/00724* (2013.01); *G06K 9/6201* (2013.01); *G06K 9/6284* (2013.01); *G06T 7/246* (2017.01); *G06K 2009/00738* (2013.01); *G06T 2207/10016* (2013.01); *G06T 2207/30196* (2013.01)

(58) Field of Classification Search
CPC .......... G06K 9/00335; G06K 9/00724; G06K 9/6201; G06K 9/6284; G06K 2009/00738; G06T 7/246; G06T 2207/10016; G06T 2207/30196
See application file for complete search history.

(56) References Cited

U.S. PATENT DOCUMENTS

| | | | |
|---|---|---|---|
| 2013/0178312 A1* | 7/2013 | Marks | A63B 71/06 473/415 |
| 2014/0159922 A1* | 6/2014 | Maliszewski | H04Q 9/00 340/870.16 |
| 2016/0143383 A1* | 5/2016 | Allen | A42B 3/0486 2/413 |
| 2017/0132215 A1* | 5/2017 | Baughman | G06F 40/30 |
| 2017/0180652 A1* | 6/2017 | Baca | G06K 9/00771 |
| 2017/0330470 A1 | 11/2017 | Acree | |
| 2018/0200603 A1 | 7/2018 | Allen et al. | |

* cited by examiner

*Primary Examiner* — Dhaval V Patel
(74) *Attorney, Agent, or Firm* — North Shore Patents, P.C.; Michele Liu Baillie

(57) ABSTRACT

Embodiments generally relate to action detection in a video based on image analysis. In some embodiments, a method includes obtaining a plurality of images associated with an activity between a first object and a second object. The method further includes performing image analysis on the plurality of images to identify one or more portions of the first object and one or more portions of the second object. The method further includes, based on the image analysis, detecting at least one interaction between a given portion of the first object with a given portion of the second object in one or more images of the plurality of images. The method further includes, based on one or more positions of the given portion of the first object and the given portion of the second object in the one or more images of the plurality of images, determining one or more characteristics of the interaction. The method further includes using a cognitive model, classifying the interaction as a permitted interaction or an unpermitted interaction based at least on the one or more characteristics.

12 Claims, 6 Drawing Sheets

300

400

500

600

ACTION DETECTION IN A VIDEO BASED ON IMAGE ANALYSIS

BACKGROUND

The detection of particular actions at an event is often performed by people. For example, during a sporting event, referees may be on a playing field to monitor the event for any fouls. Penalty calls made by people are prone to bias, which may lead to bad penalty calls. Sensors may be used to detect particular actions, where sensors that are placed on the body of the players interacting with each other. A system can determine via the sensors what body parts of one player made contact with another, which may facilitate in making penalty calls. This technique may be problematic, however, where sensors fail to adequately detect another person.

SUMMARY

Disclosed herein is a method for detecting action in a video based on image analysis, and a system and a computer program product as specified in the independent claims. Embodiments are given in the dependent claims. Embodiments can be freely combined with each other if they are not mutually exclusive.

Embodiments generally detect action in a video based on image analysis. In an embodiment, a method includes obtaining a plurality of images associated with an activity between a first object and a second object. The method further includes performing image analysis on the plurality of images to identify one or more portions of the first object and one or more portions of the second object. The method further includes, based on the image analysis, detecting at least one interaction between a given portion of the first object with a given portion of the second object in one or more images of the plurality of images. The method further includes, based on one or more positions of the given portion of the first object and the given portion of the second object in the one or more images of the plurality of images, determining one or more characteristics of the interaction. The method further includes using a cognitive model, classifying the interaction as a permitted interaction or an unpermitted interaction based at least on the one or more characteristics.

In another embodiment, the plurality of images is obtained from a video. In another aspect, each of the first object and the second object is a person. In another aspect, the one or more portions of the first object and the one or more portions of the second object are body parts. In another aspect, the at least one processor further performs operations including determining the one or more characteristics associated with the at least one interaction, and where at least one of the characteristics is a velocity of at least one of the first object and the second object. In another aspect, the at least one processor further performs operations including determining the one or more characteristics associated with the at least one interaction, and where at least one of the characteristics is one of a movement direction, a source body part, a target body part, or a relative angular direction between body parts of the first object and the second object making contact. In another aspect, the at least one processor further performs operations including determining a match between the at least one interaction and one or more predefined interactions, and where one or more of the predefined interactions are unpermitted interactions.

DETAILED DESCRIPTION

Embodiments described herein facilitate action detection in a video based on image analysis. In some embodiments, a system obtains digital images associated with an activity between a first object and a second object. An example use case may be where the first and objects are two people or players interacting in a sporting event such as a football game. The system performs image analysis on the images to identify portions of the players such as the head, torso, etc. Based on the image analysis, the system detects at least one interaction between the players. The system then determines characteristics of the interaction based on the relative positions of the body parts of the players in the images. The system uses a cognitive model to classify the interaction as either a permitted interaction or an unpermitted interaction based on the characteristics.

Figure 1:
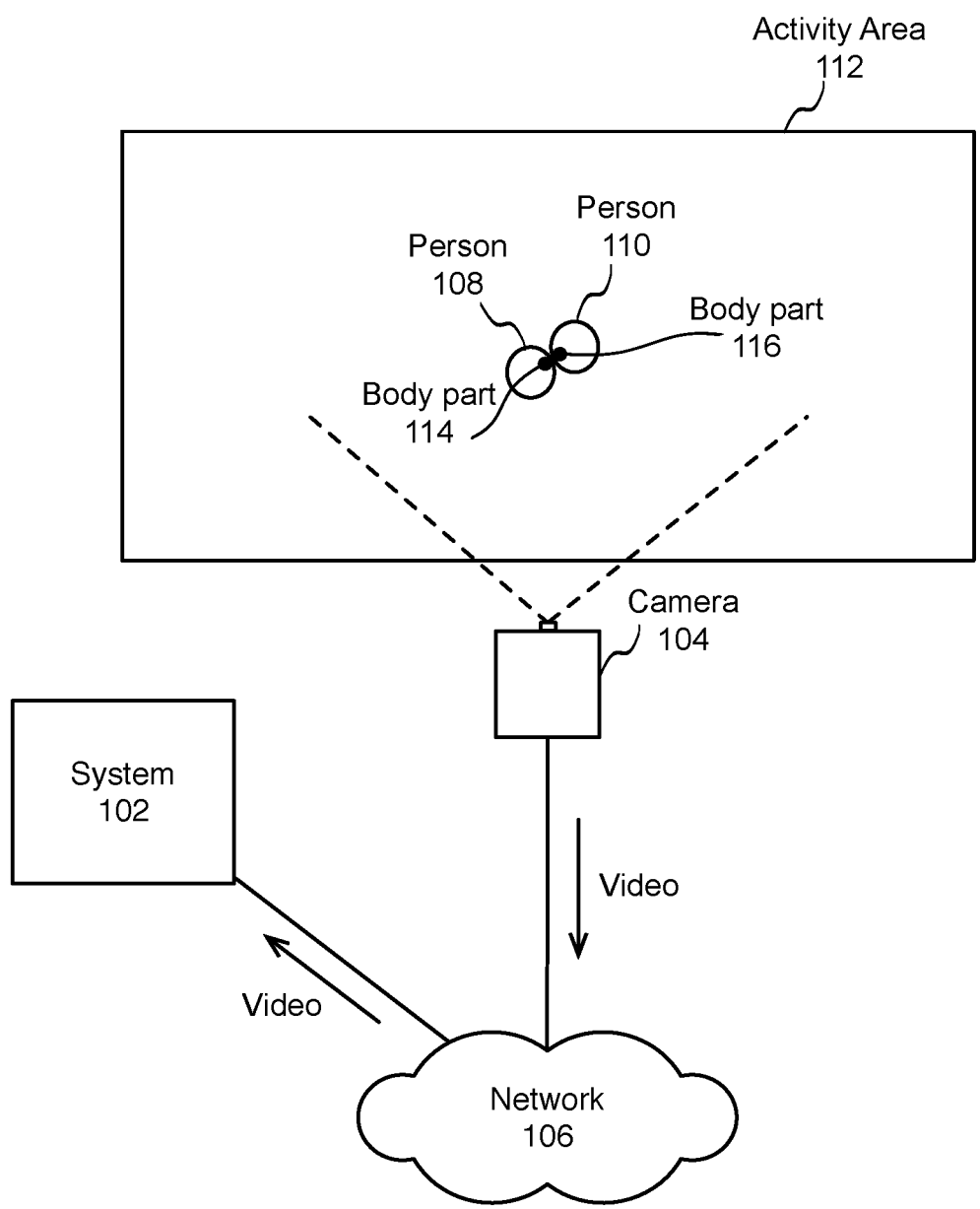
FIG. 1 is a block diagram of an example environment for detecting actions in a video based on image analysis, which may be used for implementations described herein.

FIG. 1 is a block diagram of an example environment for detecting actions in a video based on image analysis, which may be used for implementations described herein. Shown is a system 102, which performs various implementations described herein. System 102 controls a camera 104 via a network 106. Network 106 may be any suitable communication network such as a Wi-Fi network, Bluetooth network, local area network (LAN), wide area network (WAN), the Internet, etc. System 102 causes camera 104 to capture video of objects such as person 108 and person 110 in an activity area 112. Persons 108 and 110 are represented by circles. Camera 104 sends the raw video to system 102 via a network 106. The video may be a video file or a live video stream.

In various embodiments, environment 100 may be an environment where people interact, such as a sporting event with players on an athletic field. While some example embodiments are described herein in the context of a sporting event such as football, these embodiments may apply to any activity where people interact.

In various embodiments, system 102 analyzes the interaction of objects such as people in activity area 112. System 102 analyzes the interaction of the objects based on images from the video captured by camera 104. System 102 may detect and identify a portion or body part 114 of person 108 and may detect and identify a portion or body part 116 of person 110. Body parts 114 and 116 are represented by dots. The particular body parts that the system tracks may vary, depending on the particular implementation. For example, body part 114 may be the head of person 108, and body part 116 may be the torso of person 110, for example. The particular portions of the objects determined by the system may vary, and will depend on the particular implementation.

In various embodiments, system 102 characterizes the interaction between the objects to determine if any unpermitted interactions have occurred. In an example scenario, the system may detect two football players on a football field, where the players are person 108 and person 110. In this particular example, person 108 makes physical contact with person 110 when tackling person 110, which ends a particular play in the game. As shown, the circles representing person 108 and person 110 are touching, which indicates physical contact between person 108 and person 110. Also, the dots representing body parts 114 and 116 are touching, which indicates physical contact between body parts 114 and 116. Example embodiments directed to the analysis of body parts in the characterization of the interaction are described in more detail below, in connection with FIG. 3, for example.

As described in more detail herein, the system characterizes interactions of objects in images such as an interaction between persons 108 and 110. The system characterizes such interactions in order to determine if any unpermitted interactions have occurred. For example, the system may determine if an interaction (person 108 tackling person 110, etc.) is unpermitted (e.g., the way in which the tackling occurred is deemed a foul play, etc.). Furthermore, if the system detects and identifies an unpermitted interaction, the system may send out an alert (e.g., a penalty call). The system may send such an alert to one or more predetermined persons. For example, such predetermined persons may be referees in the activity area who are monitoring and refereeing the activity or game.

As described in more detail herein, the system performs various analyses based on video analysis and may optionally augment the video analysis with sensor data (e.g., sensors attached to various body parts of the people, etc.). For ease of illustration, the person being assessed for possibly initiating an unpermitted interaction or behavior may also be referred to as the target user or observed user. Further embodiments directed to the detection of actions in a video are described in more detail herein.

While system 102 performs embodiments described herein, in other embodiments, any suitable component or combination of components associated with system 102 or any suitable processor or processors associated with system 102 may facilitate performing the embodiments described herein.

For ease of illustration, FIG. 1 shows one block for each of system 102, camera 104, network 106, activity area 112. Blocks 102, 104, 106, and 112 may represent multiple systems, cameras, networks, and activity areas. Also, there may be any number of objects (e.g., people in activity area 112) and any types of portions (e.g., head, shoulders, torso, arms, legs, etc.). In other implementations, environment 100 may not have all of the components shown and/or may have other elements including other types of elements instead of, or in addition to, those shown herein.

Figure 2:
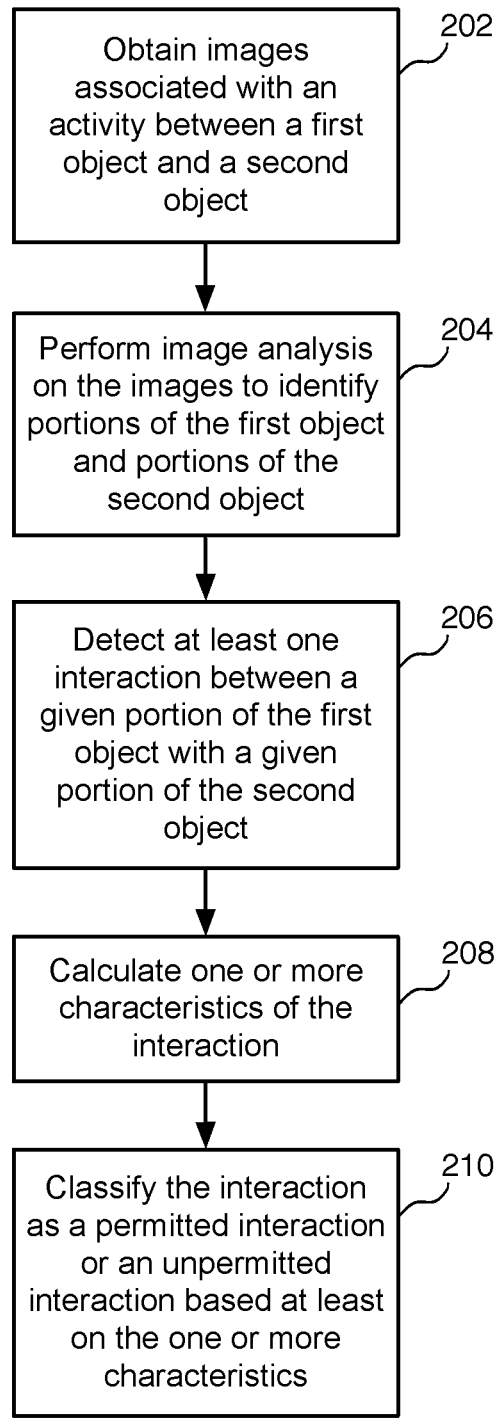
FIG. 2 is an example flow diagram for detecting action in a video based on image analysis, according to some embodiments.

FIG. 2 is an example flow diagram for detecting action in a video based on image analysis, according to some embodiments. Referring to both FIGS. 1, 2, and 3, a method begins at block 202, where a system such as system 102 obtains images associated with an activity between a first object and a second object. In various embodiments, the images are digital images obtained from a video (e.g., captured by camera 104), where the video captures aspects of an event such as a sporting event (e.g., at activity area 112). In various embodiments, each of the first object and the second object is a person. For example, the first and second objects may be football players (e.g., persons 108 and 110). In an example scenario, the images may be of football players from captured video footage of a football game, etc.

Figure 3:
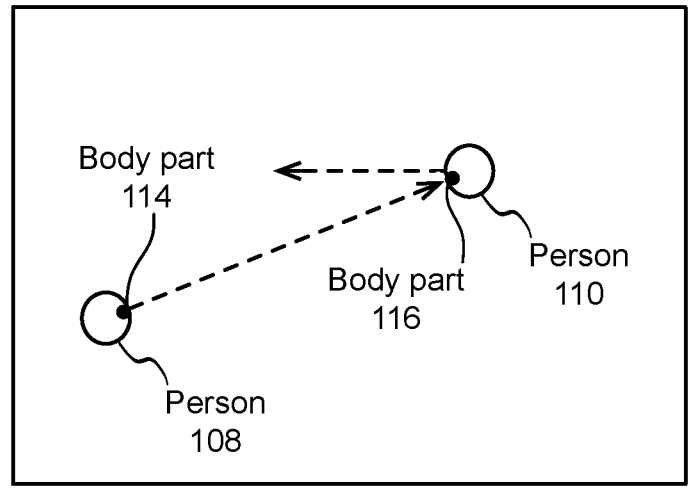
FIG. 3 is a block diagram of an example image showing an unpermitted interaction between two objects, according to some embodiments.

FIG. 3 is a block diagram of an example image 300 showing an unpermitted interaction between two objects, according to some embodiments. As shown, an object or person 108 is interacting with another object or person 110. Persons 108 and 110 are represented by circles. In various embodiments, the system analyzes the interaction between person 108 and 110 over multiple image frames. The terms image and image frame may be used interchangeably. Further embodiments directed to this example interaction are described in more detail below.

As described in more detail below, the system identifies portions or body parts of persons 108 and 110. The particular body parts that the system tracks may vary, depending on the particular implementation. As indicated herein, body parts are represented by dots. In this particular example, a body part 114 of person 108 may be the head of person 108, and a body part 116 may be the torso of person 110. The number, size, and shape of particular portions or body parts may vary, and will depend on the particular implementation.

As described in more detail herein, the system tracks different body parts of different persons and analyzes the velocity, movement direction, the source body part or parts (e.g., head of the tackler, etc.), the target body part or parts (e.g., torso of the person being tackled, etc.), and/or relative angular direction between body parts of the persons making contact during in the interaction.

For ease of illustration, FIG. 3 is showing single image 300, which is among a series of multiple images showing a progression of movement during the interaction between the objects or persons 108 and 110. For example, the system may process another image (not shown), where persons 108 and 110 are making physical contact (as in FIG. 1). The system may process one or more intermediary images (not shown), where persons 108 and 110 positioned somewhere along their respective paths (indicated by the dashed arrows). This description of the system processing a series of multiple images also applies to the example embodiments described in association with FIGS. 4, 5, and 6.

At block 204, the system performs image analysis on the images to identify one or more portions of the first object and one or more portions of the second object. In various embodiments, the one or more portions of the first object and the one or more portions of the second object are body parts. For example, referring still to FIG. 3, system 102 may detect and identify a portion or body part 114 of person 108 and may detect and identify a portion or body part 116 of person 110. In this particular example, the system has performed image analysis to identify body part 114 to be the head of person 108, and to identify body part 116 to be the torso of person 110. The number, size, and shape of particular portions of the objects determined by the system may vary, and will depend on the particular implementation.

In various embodiments, the system may utilize any suitable object detection and recognition techniques to analyze pixels in image frames of the video. The system identifies each object (e.g., person 108, etc.) and portions of each object (e.g., head, torso, arms, etc.). The system may then classify the different portions as different body parts. For example, portions may include the head, the torso, each of the legs, each of the feet, the shoulders, each of the arms, the hands, etc. of a given person. The system then tracks these portions on each object over a series of image frames.

At block 206, based on the image analysis, the system detects at least one interaction between a given portion of the first object with a given portion of the second object in one or more images of the images. Referring still to FIG. 3, in this example, the system detects an initial physical contact between a portion (e.g., head or body part 114) of person 108 and a portion (e.g., torso or body part 116) of person 110 in a sequence of image frames. The system may also determine the absence of contact between other portions. For example, it may be that the head or body part 114 of person 108 makes physical contact with the torso or body part 116, and no other portions of persons 108 and 110 make physical contact in the images. Such information is useful for the system in its overall characterization of the interaction between objects, which described in more detail below.

In various embodiments, the system uses object detection and tracking techniques in image analysis to monitor different portions of each object as separate objects or sub-objects. The system also classifies each portion as a particular part such as a head, torso, legs, arms, etc.

At block 208, the system determines one or more characteristics of the interaction. In various embodiments, the system determines the characteristics based on one or more positions of the given portion of the first object and the given portion of the second object in the one or more images of the plurality of images. Referring still to FIG. 3, in various embodiments, the system determines various characteristics associated with the interaction.

As the interaction occurs, the system tracks body parts as separate objects. This enables the system to monitor the positioning of the objects or body parts and to track relative positions of such objects. For example, in a football context, the torso is the area of the body most likely to be targeted by a defensive player in making a tackle. As such, the system may specifically track this body part in order to detect unpermitted interactions. As described in more detail herein, the system determines various characteristics of the interaction in order to detect and identify any unpermitted interactions. Example embodiments directed to the various characteristics are described in more detail below.

In various embodiments, the system may predict a physical outcome associated with a given person based on the calculated characteristics of the interactions. For example, in some embodiments, one of the characteristics may be the velocity of the first object and/or second object at the time of their convergence (at impact) as determined by pixel analysis. The system may determine the velocity or speed at which the first person was moving toward the second person before the initial contact. The system may track the velocity at multiple points long the path from where the system first detects person 108 up until the initial point of physical contact. The direction of the dashed arrows in FIG. 3 indicates the respective directions of travel of persons 108 and 110.

In various embodiments, the system tracks and compares each object and portions of each object to the previous frame in order to track the movement and speed of movement of a given object from one frame to the next. In some embodiments, the system may separately compute and store values of the velocity at each computed instance. The system may also compute and store an average velocity up until physical impact. When tracking multiple objects, the system may compute and store relative velocities of the objects.

In various embodiments, one of the characteristics may include acceleration of the first object and/or second object. The system may track and compare each object and portions of each object to the previous frame in order to track the change in velocity or speed of a given object from one frame to the next. In some embodiments, the system may separately compute and store values of the acceleration at each computed instance. The system may also compute and store an average acceleration up until physical impact. When tracking multiple objects, the system may compute and store relative acceleration of the objects.

In various embodiments, one of the characteristics may include the direction of movement (also referred to as movement direction) of the first object and/or the second object. The system may account for other characteristics in determining unpermitted interactions, and such characteristics will depend on the particular embodiment. For example, in various embodiments, one of the characteristics may include one or more of the source body part (e.g., head or helmet of the tackler) and the target body part (e.g., torso of the person being tackled). In various embodiments, one of the characteristics may include the relative angular direction between body parts of the first object and the second object making contact. For example, a punch is typically done perpendicular to the target. The system may any combination of the characteristics described herein.

The system may track and compare each object and portions of each object to the previous frame in order to track the change in position of a given object from one frame to the next. In some embodiments, the system may compute and store positional values of each computed instance. Such positional values may indicate the direction from which the given object is traveling, as well as any changes in direction and the overall travel distance between any two points along the travel path.

While some embodiments are described in the context of velocity, acceleration, direction, and distance, the characteristics may vary depending on the particular implementation. For example, characteristics may also include movement range, angle of attack, height of impact, force, weight of an object, etc. More characteristics increase accuracy of penalty calls.

Figure 4:
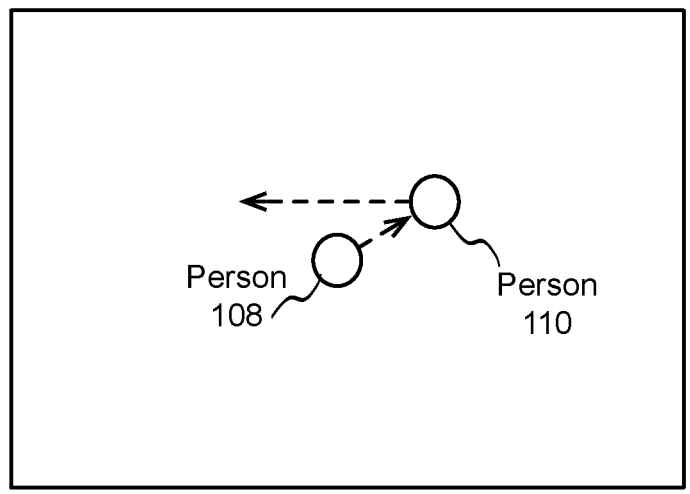
FIG. 4 is a block diagram of an example image showing a permitted interaction between two objects, according to some embodiments.

FIG. 4 is a block diagram of an example image 400 showing a permitted interaction between two objects, according to some embodiments. In some scenarios, based on the determined characteristics, the system may deem the interaction as permitted (or, may otherwise deem the interaction as not unpermitted). As shown, person 108 travels a short distance toward person 110 before tackling person 110. Such a short distance may not amount to an unpermitted interaction.

Figure 5:
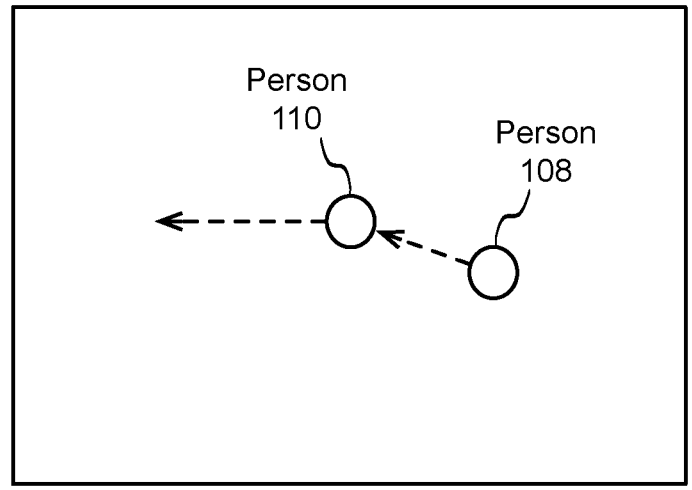
FIG. 5 is a block diagram of an example image showing another permitted interaction between two objects, according to some embodiments.

FIG. 5 is a block diagram of an example image 500 showing another permitted interaction between two objects, according to some embodiments. As shown, person 108 was travelling in generally the same direction as person 110 before tackling person 110. Such a similar angle of attack may not amount to an unpermitted interaction.

Figure 6:
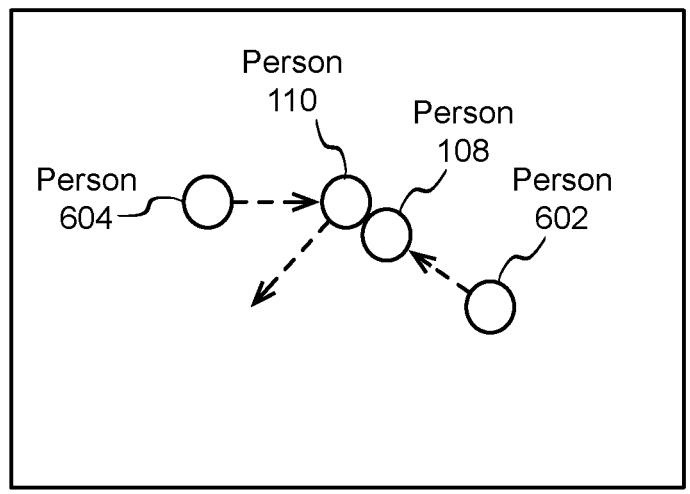
FIG. 6 is a block diagram of an example image showing another permitted interaction between more than two objects, according to some embodiments.

FIG. 6 is a block diagram of an example image 600 showing another permitted interaction between more than two objects, according to some embodiments. As indicated above, the system may detect and track multiple portions of multiple objects in a series of images, where the system accounts for multiple signals to achieve results described herein. For example, the system may process multiple signals associated with multiple objects (e.g., multiple people, etc.), multiple signals associated with multiple portions of objects (e.g., multiple body parts of people, etc.).

As shown, person 108 may make physical contact with person 110 due to a collision between persons 602 and 108, where person 602 pushes person 108 into person 110. Similarly, person 604 may also be tackling person 110. In this scenario, the interaction between persons 108 and 110 may not amount to an unpermitted interaction due to interactions with others such as with person 602 and person 604. In other words, as is often the case with a defensive/offensive line in football, players are simply pushing against one another where a foul would not be called.

At block 210, the system using a cognitive model, classifies the interaction as a permitted interaction or an unpermitted interaction based at least on the one or more characteristics. In various embodiments, the system may use deep machine learning to analyze a data set of existing interactions, including examples of both permitted interactions and unpermitted interactions. The system tags the examples of unpermitted interactions. Based on the training, the system detects and identifies unpermitted interactions. The system accounts for various characteristics in order to classify the interaction as a permitted interaction or an unpermitted interaction. Example characteristics include velocity, acceleration, direction, etc. As described in more detail below, in various embodiments, the system may augment the classifying of the interaction as a permitted interaction or an unpermitted interaction based at least on sensors attached to the first object and to the second object.

In an example application to sports such as American football, the system determines and quantifies various characteristics of an interaction in order to reduce and/or eliminate biases that a person might otherwise make, and to make fair and accurate penalty calls. This also eliminates false negatives and false positives as the system identifies unpermitted penalty calls.

An example of an unpermitted interaction is the controversial action of spearing, which is a penalty that has been added for the safety of players. Spearing may be defined as a penalty called when a defensive player makes a tackle that leads with the crown of his helmet into the offensive player. If the initial contact occurs at the top of the helmet, the tackle is illegal. Spearing is a 15-yard penalty against the defense and an automatic first down. The penalty is considered a player safety issue, as hits that lead with the top of the helmet often result in injuries. While the spearing penalty is rarely called, it actually occurs more frequently than it is called. The system may be instrumental in detecting and identifying such unpermitted interactions.

Referring again to FIG. 3, the system may determine that person 108 tackled person 110, where person 108 led with the crown of his helmet into the offensive player. The system may determine that the initial, physical contact occurred at the top of the helmet of person 108, and then deem that the tackle is illegal (e.g., spearing). The system may also determine from the images that no other body parts of persons 108 and 110 have made physical contact in the images. Such information may be helpful in better understanding the nature of the interaction, the characterization of which may help to identify or confirm unpermitted or offensive interaction. Spearing is just one example unpermitted interaction that the system may detect and track. The particular interactions may vary, and will depend on the particular implementation.

As indicated herein, while some embodiments are described in the context of a football game, these implementations also apply to other sports such as soccer, basketball, etc. These implementations may also apply to other types of events or occurrences (e.g., traffic violations or accidents).

In various embodiments, the system may identify particular interactions as permitted or unpermitted by determining a match between the interaction and one or more predefined interactions. For example, the system determines that person 108 was running at 12 miles per hour toward person 110 before tackling person 110. The system then compares the various characteristics (e.g., velocity=12 mph) interaction to predefined characteristics (e.g., velocity>10 mph) associated with a predefined interaction (e.g., person running toward another person). In various implementations, one or more of the predefined interactions are unpermitted interactions. In the example just above, person 108 was running at 12 mph, which was over the 10 mph limit. This would be an unpermitted interaction.

In various embodiments, the system may compute an assessment score, where an assessment score is a confidence level that indicates the probability that the interaction (e.g., initial contact) is classified as an unpermitted interaction. In some embodiments, the assessment score indicates that the interaction is classified as a predetermined penalty if the assessment score meets a predetermined threshold.

In various embodiments, the system uses motion tracking algorithms via pixel changes to track the motion of objects and their respective portions, set frame rate parameters, and the existing distance markers on the field. The algorithm will determine the speed of the defensive player at impact to help in determining an assessment score. In various embodiments, the assessment score may represent a probability that a particular action of the person is an unpermitted interaction. For example, the assessment score may indicate if a player was trying to leverage the full momentum of their body by moving in quickly, thus committing a particular foul such as a spear.

The system uses object tracking to monitor velocity data points for the exact conditions under which an unpermitted interaction had occurred. In some embodiments, the system may generate the assessment score based on safety thresholds. Such safety thresholds may include, for example, minimum safe contact zones and maximum safe speeds. For example, presume that the maximum safe speed is 10 miles per hour. If the person is traveling under 10 miles per hour, the system may generate a lower assessment score (e.g., 0.2), where a lower assessment score indicates a permissible interaction. If the person is traveling at the maximum of 10 miles per hour, the system may generate a medium assessment score (e.g., 0.5), where a medium assessment score may be indeterminate absent other factors (e.g., distance, angle of attack, etc.). If the person is traveling over 10 miles per hour, the system may generate a higher assessment score (e.g., 0.7), where a higher assessment score indicates an unpermitted interaction.

As indicated above, the system may also monitor various different body parts (e.g., arms and legs, etc.) in order to determine their relative positions at a point of collision between other objects. The system may factor these body parts and positions into the assessment score. In some implementations, the assessment score may also represent the likelihood that the person who committed a particular unpermitted interaction was aiming for a collision of the crown of the head on the torso. The higher the assessment score, the more likely the unpermitted interaction. Also, the higher the assessment score, the more likely the unpermitted interaction was intentionally/purposefully committed. The higher the assessment score, the more likely the unpermitted interaction. The lower assessment score, the more likely the unpermitted interaction was unintentionally committed (e.g., no spearing in cases where a player inadvertently falling head first into another player. As such, embodiments described herein help to reduce bad penalty calls.

In various embodiments, the system generates an alert in response to a determination that the interaction is an unpermitted interaction. The system then sends the alert to one or more people (e.g., referees). In some embodiments, the alert may include images that show which portion (e.g., head) of one person (e.g., person 108) made physical contact with which portion (e.g., torso) of another person (e.g., person 110). Alerts may be sent via any suitable network to any suitable client device of the referee (e.g., smart phone, etc.).

In various embodiments, the system may perform image analysis in real time. For example, the system may be administer real time administering of penalties to help improve the fairness and equality of games as well as to improve the players safety. The system also helps referees to make penalty calls in real-time before a play ends.

In some embodiments, the system initiates image analysis upon initial contact. In some embodiments, the system may highlight the exact moment of initial contact via photos included in an alert to a referee, allowing the officials to throw the penalty flag.

In some embodiments, the system may improve efficiency of tracking multiple objects using various techniques. The system may be selective about sample data and track particular objects. For example, the system may detect referees on the field but might not track the referees, because referees typically do not commit unpermitted interactions with the sport players. In some embodiments, the system may group objects together and track the group. For example, the system may group defensive linemen together and track the group in order to optimize processing resources. If one or more particular objects in the group deviates from the group, the system may start to track those objects as separate objects. This may be because those objects are more likely to commit an unpermitted interaction and should thus be monitored more closely and accurately.

In some embodiments, the system may be triggered by particular behaviors of a given object to start tracking the object more closely based on one or more predefined criteria. For example, if a given object (e.g., person 108) accelerates above a predetermined velocity threshold, the system may start tracking that object in order to monitor for any unpermitted interactions.

In various embodiments, the system may perform image analysis as described herein and also augment the image analysis data with sensor data. In various embodiments, the system may augment the classifying of the interaction as a permitted interaction or an unpermitted interaction based at least on sensors attached to the first object and to the second object. For example, when the system determines characteristics of the interaction based on image analysis (e.g., contact speed, contact angle, etc.), the system may augment and corroborate any data derived from image analysis with collected sensor data. Sensors may include sensors such as Internet of Things (IoT) sensors. Sensors may also include accelerometers in the helmet, position sensors in the protective gear for 3D plane rendering, etc.

In an example embodiment, a first player may have a sensor such as sensors in the player's helmet as well as at other points on the player's body (e.g., attached to other protective gear). A second player may also have a sensor in that player's helmet as well as at other points on the players body. As such, the system may determine that the helmet of the first person collided with a body part of the second person based on image analysis determining information such as contact speed, contact angle, etc. The system may also corroborate similar information (e.g., contact speed, contact angle, etc.) from sensor data.

The augmented data collection potentially allows for increased accuracy and certainty of characterizing interactions (e.g., unpermitted interactions such as penalties, etc.). Additionally, the ability to detect a collision on any part of the body allows for fast and more accurate identifying and assessing of unpermitted interactions (e.g., spear calls, etc.) that might otherwise be missed. For example, being able to assess penalties immediately and accurately provides fairer and more balanced alerts for unpermitted interactions (e.g., penalty calls, etc.) as the system removes any implicit biases of people (e.g., human referees, etc.). Because the system primarily performs image analysis with optional augmentation with sensor data, any faulty sensors would not adversely affect results described herein.

Implementations described herein provide various benefits. For example, embodiments provide increased efficiency of detecting particular actions such as unpermitted interactions between two people (e.g., spearing in a football game, etc.). Embodiments also provide increased inherent safety of the people (e.g., football players) by detecting unpermitted interactions. Embodiments also provide increased confidence in the neutral nature of referee calls.

Figure 7:
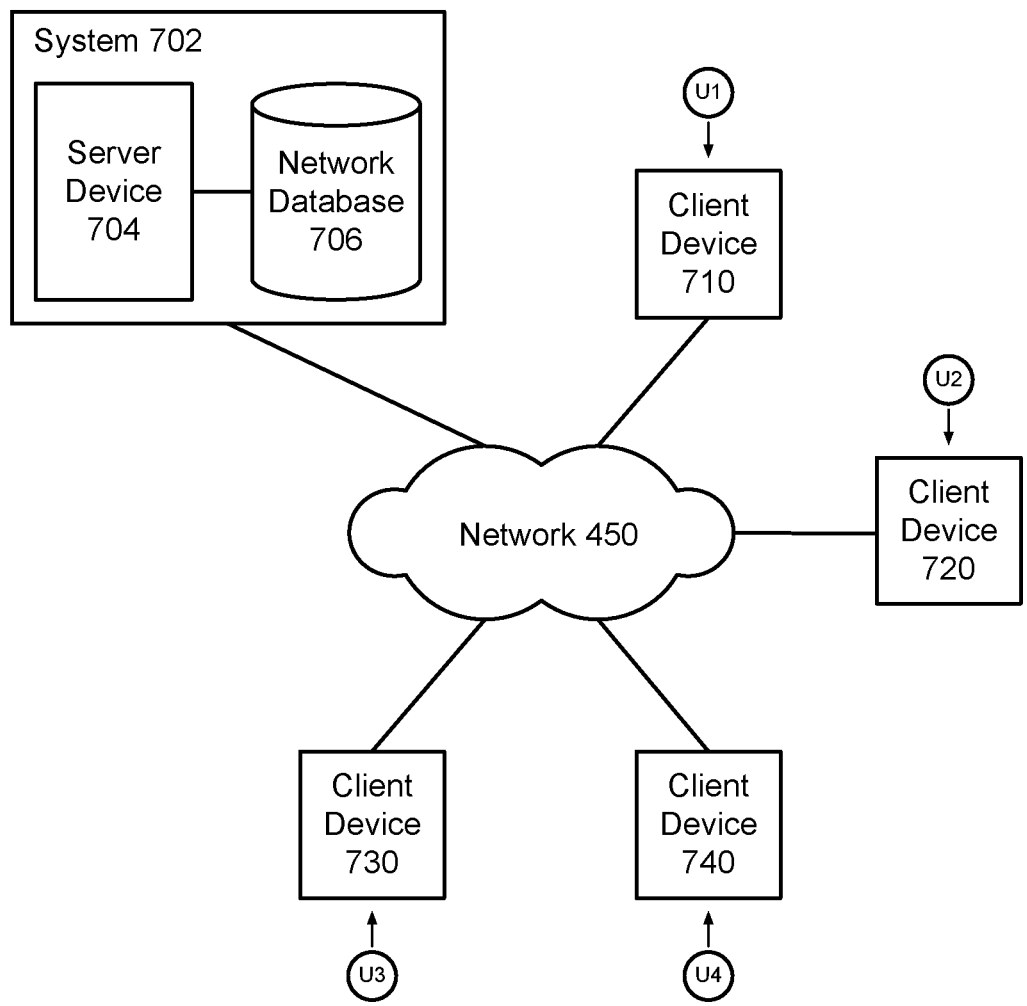
FIG. 7 is a block diagram of an example network environment, which may be used for some implementations described herein.

FIG. 7 is a block diagram of an example network environment 700, which may be used for some implementations described herein. In some implementations, network environment 700 includes a system 702, which includes a server device 704 and a database 706. Network environment 700 also includes client devices 710, 720, 730, and 740, which may communicate with system 702 and/or may communicate with each other directly or via system 702. Network environment 700 also includes a network 750 through which system 702 and client devices 710, 720, 730, and 740 communicate. Network 750 may be any suitable communication network such as a Wi-Fi network, Bluetooth network, LAN, WAN, the Internet, etc.

For ease of illustration, FIG. 7 shows one block for each of system 702, server device 704, and network database 706, and shows four blocks for client devices 710, 720, 730, and 740. Blocks 702, 704, and 706 may represent multiple systems, server devices, and network databases. Also, there may be any number of client devices. In other implementations, environment 700 may not have all of the components shown and/or may have other elements including other types of elements instead of, or in addition to, those shown herein.

While server 704 of system 702 performs embodiments described herein, in other embodiments, any suitable component or combination of components associated with server 702 or any suitable processor or processors associated with server 702 may facilitate performing the embodiments described herein.

Figure 8:
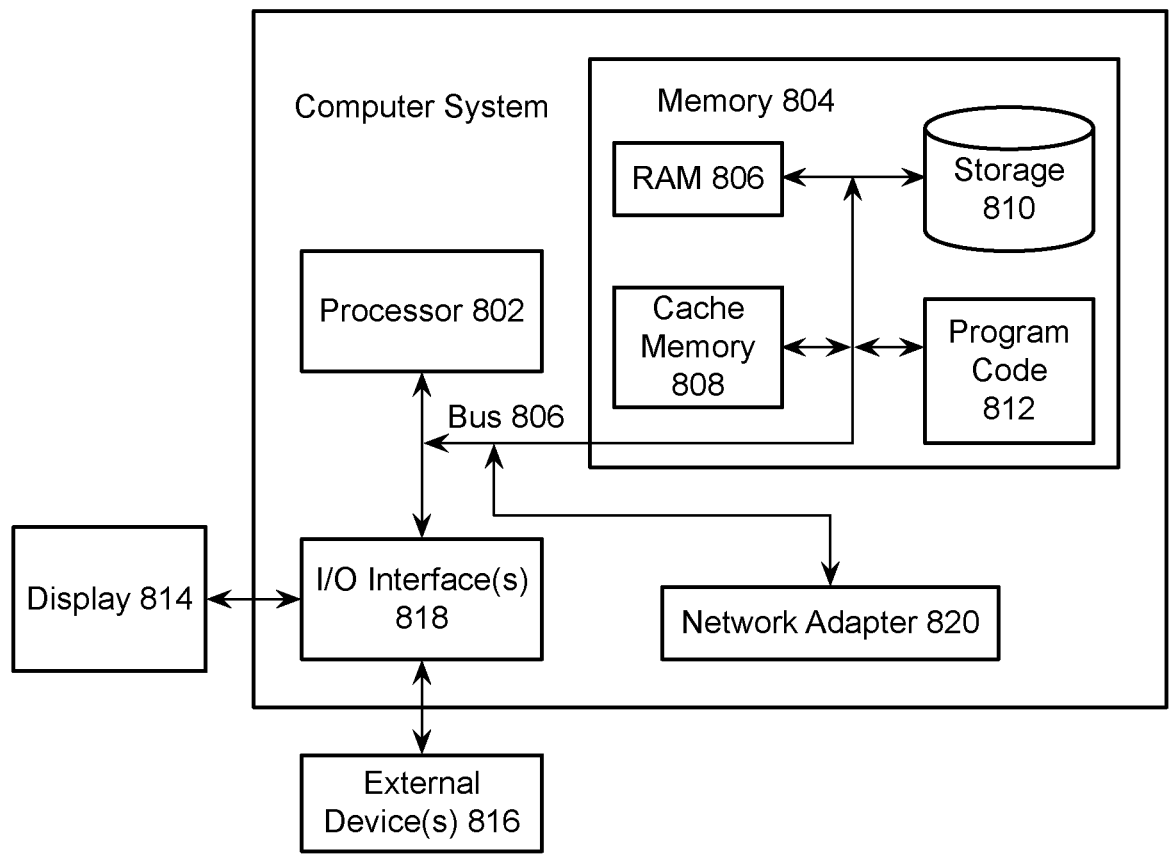
FIG. 8 is a block diagram of an example computer system, which may be used for embodiments described herein.

FIG. 8 is a block diagram of an example computer system 800, which may be used for embodiments described herein. For example, computer system 800 may be used to implement system 102 of FIG. 1 and/or server device 704 of FIG. 7, as well as to perform embodiments described herein. Computer system 800 is operationally coupled to one or more processing units such as processor 802, a memory 804, and a bus 806 that couples to various system components, including processor 802 and memory 804. Bus 806 represents one or more of any of several types of bus structures, including a memory bus, a memory controller, a peripheral bus, an accelerated graphics port, a processor or local bus using any of a variety of bus architectures, etc. Memory 804 may include computer readable media in the form of volatile memory, such as a random access memory (RAM) 806, a cache memory 808, and a storage unit 810, which may include non-volatile storage media or other types of memory. Memory 804 may include at least one program product having a set of at least one program code module such as program code 812 that are configured to carry out the functions of embodiments described herein when executed by processor 802. Computer system 800 may also communicate with a display 814 or one or more other external devices 816 via input/output (I/O) interface(s) 818. Computer system 800 may also communicate with one or more networks via network adapter 820. In other implementations, computer system 800 may not have all of the components shown and/or may have other elements including other types of elements instead of, or in addition to, those shown herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
   at least one processor and a computer readable storage medium having program instructions embodied therewith, the program instructions executable by the at least one processor to cause the at least one processor to perform operations comprising:
   obtaining a plurality of images associated with an activity between a first person and a second person;
   performing image analysis on the plurality of images to identify one or more body parts of the first person and one or more body parts of the second person;
   using image analysis, tracking the one or more body parts of the first person and the one or more body parts of the second person over one or more images of the plurality of images;
   based on the image analysis, detecting a physical contact between a given body part of the first person with a given body part of the second person in the one or more images of the plurality of images;
   based on the image analysis, determining one or more positions of the given body part of the first person and the given body part of the second person at the physical contact in the one or more images of the plurality of images;
   using the one or more positions, computing relative velocities of the given body part of the first person and the given body part of the second person at the physical contact;
   based on the relative velocities and the one or more positions of the given body part of the first person and the given body part of the second person in the one or more images of the plurality of images, determining one or more characteristics of the physical contact; and
   using a cognitive model, classifying the physical contact as a permitted interaction or an unpermitted interaction based at least on the one or more characteristics.

2. The system of claim 1, wherein the plurality of images is obtained from a video.

3. The system of claim 1, wherein the first object is a head of a first person, and wherein the second object is a torso of a second person.

4. The system of claim 1, wherein the at least one processor further performs operations comprising determining the one or more characteristics associated with the physical contact, and wherein at least one of the characteristics is one of a movement direction, a source body part, a target body part, or relative angular direction between the given body parts of the first person and the second person making contact.

5. The system of claim 1, wherein the at least one processor further performs operations comprising determining a match between the physical contact and one or more predefined interactions, and wherein one or more of the predefined interactions are unpermitted interactions.

6. The system of claim 1, wherein the at least one processor further performs operations comprising augmenting the classifying of the physical contact as a permitted interaction or an unpermitted interaction based at least on sensor data.

7. A computer program product comprising a non-transitory_computer readable storage medium having program instructions embodied therewith, the program instructions executable by at least one processor to cause the at least one processor to perform operations comprising:
   obtaining a plurality of images associated with an activity between a first person and a second person;
   performing image analysis on the plurality of images to identify one or more body parts of the first person and one or more body parts of the second person;
   using image analysis, tracking the one or more body parts of the first person and the one or more body parts of the second person over one or more images of the plurality of images;
   based on the image analysis, detecting a physical contact between a given body part of the first person with a given body part of the second person in the one or more images of the plurality of images;
   based on the image analysis, determining one or more positions of the given body part of the first person and the given body part of the second person at the physical contact in the one or more images of the plurality of images;
   using the one or more positions, computing relative velocities of the given body part of the first person and the given body part of the second person at the physical contact;
   based on the relative velocities and the one or more positions of the given body part of the first person and the given body part of the second person in the one or more images of the plurality of images, determining one or more characteristics of the physical contact; and
   using a cognitive model, classifying the physical contact as a permitted interaction or an unpermitted interaction based at least on the one or more characteristics.

8. The computer program product of claim 7, wherein the plurality of images is obtained from a video.

9. The computer program product of claim 7, wherein the at least one processor further performs operations comprising determining the one or more characteristics associated with the physical contact, and wherein at least one of the characteristics is one of a movement direction, a source body part, a target body part, or a relative angular direction between the given body parts of the first person and the second person making contact.

10. The computer program product of claim 7, wherein the at least one processor further performs operations comprising determining a match between the physical contact and one or more predefined interactions, and wherein one or more of the predefined interactions are unpermitted interactions.

11. A computer-implemented method comprising:
obtaining a plurality of images associated with an activity between a first person and a second person;
performing image analysis on the plurality of images to identify one or more body parts of the first person and one or more body parts of the second person;
using image analysis, tracking the one or more body parts of the first person and the one or more body parts of the second person over one or more images of the plurality of images;
based on the image analysis, detecting a physical contact between a given body part of the first person with a given body part of the second person in the one or more images of the plurality of images;
based on the image analysis, determining one or more positions of the given body part of the first person and the given body part of the second person at the physical contact in the one or more images of the plurality of images;
using the one or more positions, computing relative velocities of the given body part of the first person and the given body part of the second person at the physical contact;
based on the relative velocities and the one or more positions of the given body part of the first person and the given body part of the second person in the one or more images of the plurality of images, determining one or more characteristics of the physical contact; and
using a cognitive model, classifying the physical contact as a permitted interaction or an unpermitted interaction based at least on the one or more characteristics.

12. The method of claim 11, wherein the plurality of images is obtained from a video.

* * * * *